US012626871B2

(12) United States Patent
Lewis et al.

(10) Patent No.: US 12,626,871 B2
(45) Date of Patent: May 12, 2026

(54) RELAY, AND METHOD FOR OPERATING A RELAY

(71) Applicant: Robert Bosch GmbH, Stuttgart (DE)

(72) Inventors: Matthew Lewis, Reutlingen (DE); Bernd Klein, Reutlingen (DE); David Bill, Rheinhausen (DE); Jochen Reinmuth, Reutlingen (DE); Johannes Holger Moeck, Haigerloch-Hart (DE); Michael Krueger, Reutlingen (DE); Seyed Amir Fouad Farshchi Yazdi, Lecco (IT); Stefan Pinter, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 229 days.

(21) Appl. No.: 18/551,469

(22) PCT Filed: Oct. 20, 2022

(86) PCT No.: PCT/EP2022/079175
§ 371 (c)(1),
(2) Date: Sep. 20, 2023

(87) PCT Pub. No.: WO2023/078684
PCT Pub. Date: May 11, 2023

(65) Prior Publication Data

US 2024/0194423 A1 Jun. 13, 2024

(30) Foreign Application Priority Data

Nov. 3, 2021 (DE) ..................... 10 2021 212 369.4

(51) Int. Cl.
*H01H 1/00* (2006.01)
*H01H 9/02* (2006.01)

(52) U.S. Cl.
CPC ............ *H01H 1/0036* (2013.01); *H01H 9/02* (2013.01)

(58) Field of Classification Search
CPC ............. H01H 2057/006; H01H 59/00; H01H 59/0009; H01H 2205/004; H01H 2203/02;
(Continued)

(56) References Cited

U.S. PATENT DOCUMENTS 8,378,766 B2 2/2013 Lee et al.
8,476,970 B2 * 7/2013 Mokhtar ............ G01C 19/5776 327/554
(Continued)

FOREIGN PATENT DOCUMENTS

DE 102014224559 A1 6/2016
DE 102017121611 A1 3/2018
(Continued)

OTHER PUBLICATIONS

International Search Report for PCT/EP2022/079175, Issued Feb. 20, 2023.

*Primary Examiner* — Anthony R Jimenez
(74) *Attorney, Agent, or Firm* — NORTON ROSE FULBRIGHT US LLP

(57) ABSTRACT

A relay. The relay includes a housing and a microelectromechanical (MEMS) component having a MEMS switch that can be switched between two stable states. The relay further comprises an application-specific integrated circuit (ASIC) component which, along with the MEMS component, is arranged in the housing. The ASIC component is configured to control the MEMS switch and/or to monitor a functionality of the MEMS switch.

16 Claims, 3 Drawing Sheets

200

(58) Field of Classification Search
CPC ............. H01H 2001/0042; H01H 1/00; H01H 1/0036; H01H 57/00; H01H 9/02; B81C 1/0023; B81C 2201/0109; B81C 2201/013; B81C 2201/0167; B81C 2201/017; B81C 2203/00; B81C 2203/0136; B81C 2203/0172; B81C 1/00; B81C 1/00015; B81C 1/00119; B81C 1/00182; B81C 2203/01; B81C 2203/0015; B81C 2203/00365; B81C 2203/00476; B81C 2203/00619; B81C 2203/00626; B81C 2203/00666; B81B 3/00; B81B 3/0018; B81B 3/0035; B81B 3/004; B81B 3/0051; B81B 3/0072; B81B 3/0021; B81B 2203/00; B81B 2203/0118; B81B 2203/0136; B81B 2201/01; B81B 2201/014; B81B 2203/0315; B81B 2203/04; B81B 7/0032; B81B 7/0074; B81B 7/0035; H01L 41/1136
USPC .................................................. 200/237, 514
See application file for complete search history.

(56) References Cited

U.S. PATENT DOCUMENTS

2002/0191897 A1 12/2002 Hallbjorner et al.
2006/0097727 A1 5/2006 Messenger et al.
2006/0208326 A1 9/2006 Nasiri et al.
2014/0202838 A1 7/2014 Sano et al.
2014/0253260 A1 9/2014 Horimoto et al.
2015/0035387 A1 2/2015 Macnamara et al.
2015/0115376 A1 * 4/2015 Chen ..................... B81B 7/0035 438/51
2015/0375995 A1 12/2015 Steimle et al.

FOREIGN PATENT DOCUMENTS

FR 2839194 A1 10/2003
WO 2009102129 A2 8/2009
WO 2010049865 A1 5/2010

* cited by examiner

RELAY, AND METHOD FOR OPERATING A RELAY

FIELD

The present invention relates to a relay and a method for operating a relay.

BACKGROUND INFORMATION

A relay is an electrically operated switch. A circuit can be used to switch between a first switching state and a second switching state. For example, electromagnetic changes due to the flow or absence of a current in a coil can cause a mechanical element of the switch to close or open. An exemplary relay is the reed relay, which comprises two electrical contacts, a coil, and a flyback diode.

Relays can be designed as microelectromechanical (MEMS) components. An exemplary MEMS relay is described in U.S. Pat. No. 8,378,766 B2. The same processing steps that are used in the production of conventional semiconductor structures can be used in this instance.

Mechanical relays typically consist only of passive components without additional intelligent functions, i.e., built-in testing, monitoring, or other functions. However, in many cases it may be useful to monitor the status or state of the relay. This is especially true for particularly critical systems.

Further, any mechanical relay wears out slowly over its lifetime, and as it ages, problems can occur. For example, the relay can no longer be switched on or off, the contact resistance can increase to an uncontrollable level, or the relay can switch more slowly due to increased adhesive forces.

To the extent that such intelligent functions are needed for monitoring the functionality of the relay, they must be added with external components and devices, which increases system complexity, area, and costs.

SUMMARY

The present invention provides a relay and a method for operating a relay.

Preferred embodiments of the present invention are disclosed herein.

According to a first aspect, the present invention accordingly relates to a relay. According to an example embodiment of the present invention, the relay comprises a housing and a microelectromechanical, MEMS, component comprising a MEMS switch that can be switched between two stable states. The relay further comprises an application-specific integrated circuit (ASIC) component which, along with the MEMS component, is arranged in the housing. The ASIC component is configured to control the MEMS switch and/or to monitor a functionality of the MEMS switch.

According to a second aspect, the present invention relates to a method for operating a relay, wherein the relay features a housing and a microelectromechanical, MEMS, component comprising a MEMS switch that can be switched between two stable states, and wherein the relay features an application-specific integrated circuit, ASIC, component arranged in the housing together with the MEMS component. According to an example embodiment of the present invention, the MEMS switch is controlled by the ASIC component and/or the ASIC component monitors a functionality of the MEMS switch.

An example embodiment of the present invention provides a relay comprising a MEMS component and an ASIC component in a common housing, wherein the evaluation device already present in the ASIC component is used to monitor and/or control the MEMS switch of the MEMS component. This can provide a very compact and cost-effective relay that can also provide intelligent functions for monitoring.

By means of the ASIC component, a multitude of intelligent functions can be integrated into the relay at minimal cost. Also, in many cases, more detailed information can be provided because the ASIC component has direct access to all parts of the relay.

By using the logic of the ASIC component to control or monitor the relay, it is possible to add the corresponding functionalities with only minimal additional production costs. There is no need for a separate ASIC, which would be significantly more expensive to manufacture.

In the following, the term "monitoring" can be understood as measuring, evaluating, or checking a corresponding variable. Furthermore, it is possible to compare the corresponding variable with predefined values in order to ascertain whether or not there is an error with respect to the corresponding variable. A functionality of the MEMS switch can be understood as the ability to switch correctly. Further, various characterizations of the MEMS switch may also be understood hereunder, such as a closing voltage, a relay current, or other features described in particular below.

According to another embodiment of the relay of the present invention, the ASIC component is configured as a cap of the MEMS component. By using the ASIC component as a cap, a compact, hermetically sealed relay can be provided with various metallization options.

According to a further embodiment of the present invention, the relay comprises (optionally in addition to an electrode for switching the MEMS switch) an electrode for capacitively ascertaining a state of motion of a movable structure (i.e., the element that can be switched) of the MEMS switch.

According to another embodiment of the relay of the present invention, the ASIC component is configured to monitor a switching state of the MEMS switch. For this purpose, the ASIC component can ascertain whether the MEMS switch is on or off. The MEMS switch may comprise control electrodes for this purpose. Depending on a voltage applied to the control electrodes, electrodes in a contact area are connected or disconnected so that the MEMS switch is on or off. When the MEMS switch switches, the control electrodes move closer together, increasing capacitance. The ASIC component may be configured to measure this change in capacitance at the control electrodes.

According to a further embodiment of the relay of the present invention, the ASIC component is configured to measure the change in capacitance at the control electrodes using a radio frequency signal and a DC signal. When a DC voltage is used to control the switching operation, the ASIC component can measure the capacitance of the control electrodes by means of a high-frequency signal applied to the control electrodes. The high-frequency signal can be a square wave signal. This allows the ASIC to detect whether the relay has switched or dropped out. If the capacitance of the electrodes is too large, a separate electrode area can also be provided to monitor the switching operation, which can also reduce the power requirement of the high-frequency signal. Further, the use of a separate electrode may be provided to directly measure the charge when the MEMS switch switches and the capacitance changes.

According to another embodiment of the relay of the present invention, the ASIC component is configured to monitor a closing voltage and/or opening voltage of the MEMS switch. For this purpose, the ASIC component can be configured to apply a control voltage for switching the MEMS switch. By sending the control voltage to switch the relay, the ASIC component can also measure the closing and opening voltage.

According to another embodiment of the relay of the present invention, the ASIC component is configured to monitor a switch-on time and/or switch-off time of the MEMS switch. By measuring the positions of electrodes and the control voltage, the ASIC component can measure the respective switching time.

According to another embodiment of the relay of the present invention, the ASIC component is configured to monitor a relay current through the MEMS switch. The ASIC component may be configured to measure a voltage across a shunt resistor to ascertain the relay current. According to another embodiment, a coil may be provided around conductive traces of the MEMS switch to measure current flow. This has the advantage that the galvanic isolation is maintained.

According to another embodiment of the relay of the present invention, the ASIC component is configured to monitor a contact resistance of a contact area of electrodes of the MEMS switch. To determine the contact resistance, the ASIC component may be configured to measure a respective voltage on both sides of the contact area. According to a further embodiment, it may be provided that the ASIC component ascertains a heating of the relay based on a measured current flowing through the MEMS switch. The ASIC component can further ascertain the dissipated heat using two measurement points, with a first measurement point located near the contacts and a second measurement point arranged further away. This allows the ASIC component to estimate how high the resistance of the contacts is without impairing the galvanic isolation.

Based on the monitored functionality, the ASIC component can further ascertain information regarding the MEMS switch. The following use cases and functions offer a significant advantage over existing mechanical relays. In each of these use cases, the ASIC component can, for example, set a “pin” to a specific level (such as “high” in an interrupt operation) or write to an internal error register that can be read out by the user. These parameters can be monitored in real time.

According to a further embodiment of the relay of the present invention, the ASIC component is accordingly configured to perform a Built-In-Self-Test (BIST) or online test. Thus, a control signal can be used to verify that the MEMS switch opens and closes as expected and at the correct speed when no load or a specific load is connected.

According to another embodiment of the relay of the present invention, the ASIC component is configured to ascertain critical system information. For example, the ASIC component can ascertain whether the MEMS switch is switched on or switched off. If the MEMS switch is not in the correct state, an error message may be issued. Further, the ASIC component may be configured to ascertain whether the voltage applied to the MEMS switch or the current flowing through the MEMS switch is too high, i.e., exceeds predetermined threshold values. In this case, the ASIC component may also output an error and/or prevent the relay from switching. Alternatively or additionally, the ASIC component may be configured to ascertain whether the contact resistance has increased and, for example, exceeds a predetermined threshold value. In this case the ASIC component issues an error message.

According to a further embodiment of the relay of the present invention, the ASIC component is configured to calculate an expected lifetime of the relay based on the monitored functionality of the MEMS switch. For this purpose, the ASIC component can monitor the lifetime of various components of the relay.

This allows the ASIC component to ascertain the remaining lifetime of the contact area of the MEMS switch. As the relay ages, the static friction on the contact surfaces normally increases. This decreases the voltage to open the MEMS switch and increases the time to open the MEMS switch. These parameters can be characterized and monitored so that the ASIC component can estimate how long the remaining lifetime of the MEMS switch is.

The ASIC component can further ascertain an expected lifetime of the contact resistance. Contact resistance normally increases over time as contacts degrade from switching at high temperatures. The contact resistance can increase by a factor of 10 to 100 over time before it fails permanently.

According to another embodiment of the relay of the present invention, the ASIC component is configured to control different types of MEMS switches, namely other circuit control switches in addition to the main switch itself. The circuit control switches can switch on and off several circuit breakers in the circuit. Lifetime-critical parameters, such as cycle number, resistance, temperature, or contact friction are monitored by the ASIC component. When a circuit breaker reaches the end of its lifetime, the circuit control switches connect a next unused circuit breaker into the circuit, thus replacing the old circuit breaker.

According to another embodiment of the relay of the present invention, the ASIC component is configured to monitor the power supply. If the current flowing through the relay can be monitored, any control device can see how much current a device connected to the relay is consuming.

According to another embodiment of the relay of the present invention, the ASIC component features an interface to output an electrical signal depending on the monitored functionality of the MEMS switch. The interface can be an SPI (Serial Peripheral Interface) interface or an I2C (Inter-Integrated Circuit) interface. External devices can communicate with the relay via the interface. The ASIC component can further provide standard functionality as an SPI interface for controlling larger designs that contain multiple switches.

According to a further embodiment of the relay of the present invention, the ASIC component is configured to output an error signal if the monitored functionality of the MEMS switch does not meet predetermined requirements.

According to another embodiment of the relay of the present invention, the functionality of the MEMS switch monitored by the ASIC component comprises a switching delay of the MEMS switch, wherein the ASIC component is configured to compensate for the switching delay of the MEMS switch. Alternatively or additionally, the ASIC component can output a signal based on the monitored switching delay of the MEMS switch, such as a precise indication of the switching delay. This signal can be output to an external control unit, for example.

According to another embodiment of the relay of the present invention, the ASIC component is configured to ensure a precise, timed and fast switching operation. For this purpose, the ASIC component can measure an average switch-on time. The desired time for the switching point can be transmitted to the relay, and in the relay the signal is triggered earlier according to a known delay.

According to a further embodiment of the relay of the present invention, the ASIC component is configured to measure and output an average switch-on time. The switching signal can then be sent to the relay by an external control unit correspondingly earlier to compensate for a delay.

According to another embodiment of the relay of the present invention, the ASIC component is configured to measure an average switch-off time. The temporal behavior of the switch-off time, i.e., as a function of the lifetime, is typically known. The ASIC component can then calculate a moving average of the switching time. The desired switching point is transmitted to the relay and in the relay the signal is triggered earlier according to the known delay.

According to another embodiment of the relay of the present invention, the ASIC component is configured to measure an average switch-on time. The ASIC component calculates a moving average of the switching time either in the relay or outside the relay. The switching signal is sent to the relay correspondingly earlier.

According to another embodiment of the relay of the present invention, a specific time is specified during which the relay is to be on or off. The ASIC component may then be configured to switch the relay accordingly so that the relay is on or off for exactly the specified time.

According to a further embodiment of the relay of the present invention, switching delays can also be specified for certain applications.

Further advantages, features, and details of the present invention arise from the following description, in which various exemplary embodiments are described in detail with reference to the figures.

DETAILED DESCRIPTION OF EXAMPLE EMBODIMENTS

In all figures, identical or functionally identical elements and devices are provided with the same reference signs. The numbering of the method steps is used for reasons of clarity and is generally not intended to imply any particular temporal order. It is in particular also possible to perform multiple method steps simultaneously.

Figure 1:
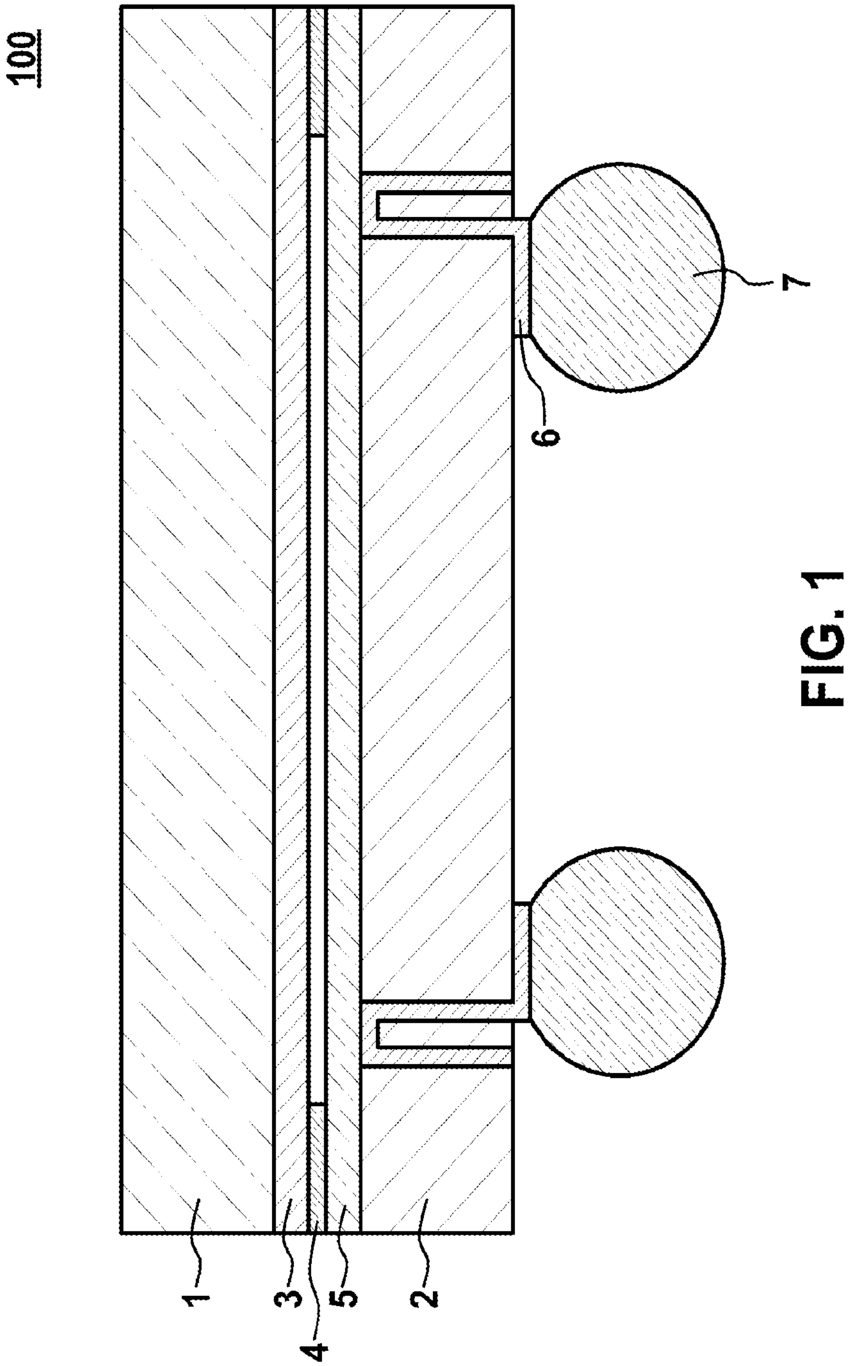
FIG. 1 shows a schematic cross-sectional view of a relay according to one embodiment of the present invention.

FIG. 1 shows a schematic cross-sectional view of a relay 100. The relay 100 comprises a MEMS component 1 with a MEMS switch (not shown) that can be switched between two stable states. Further, the relay comprises an ASIC component 2, which is configured as a cap of the MEMS component 1.

The MEMS component 1 comprises an active structure 3 facing the ASIC component 2, which active structure 3 comprises, for example, the MEMS switch. Accordingly, the ASIC component 2 comprises an active structure 5 facing the MEMS component 1, which active structure 5 comprises, for example, the computing unit. The MEMS component 1 and the ASIC component 2 are connected to each other via an interconnect layer 4, creating a hermetically-sealed space. ASIC component 2 thus serves as a cap of MEMS component 1.

ASIC component 2 can control the MEMS switch, such as turning the MEMS switch on or off. Additionally or alternatively, the ASIC component 2 may monitor a functionality of the MEMS switch. Thus, the ASIC component 2 can ascertain a switching state of the MEMS switch. Further, the ASIC component 2 can measure a change in capacitance at control electrodes of the MEMS switch. The ASIC component 2 may be further configured to measure a closing voltage and/or opening voltage of the MEMS switch. The ASIC component 2 can additionally or alternatively ascertain a switch-on time and/or switch-off time of the MEMS switch. The ASIC component 2 can measure a relay current through the MEMS switch. Further, the ASIC component 2 can ascertain a contact resistance of a contact area of electrodes of the MEMS switch.

The ASIC component 2 comprises a digital and analog logic part, i.e., a computing unit for evaluating data, such as the measurement data for calculating the functionalities of the MEMS switch described above. The logic part of the ASIC component 2 may comprise standard functions, such as an SPI interface for controlling multiple relays or a charge pump for a higher control voltage. The connection to external devices can be made through a connection structure 6 and solder balls 7, through which electrical signals can be sent and received.

The ASIC component 2 may be configured to perform a built-in self-test or online test. The ASIC component 2 can further ascertain critical system information. The ASIC component 2 can calculate a lifetime of components of the relay, such as a contact area of the MEMS switch or the contact resistance, based on the monitored functionality of the MEMS switch.

The ASIC component 2 may also be configured to control multiple MEMS switches.

Further, the ASIC component 2 may be configured to monitor a power supply. The ASIC component 2 can also control the switching operation, for example by measuring and taking into account delays during switching.

Figure 2:
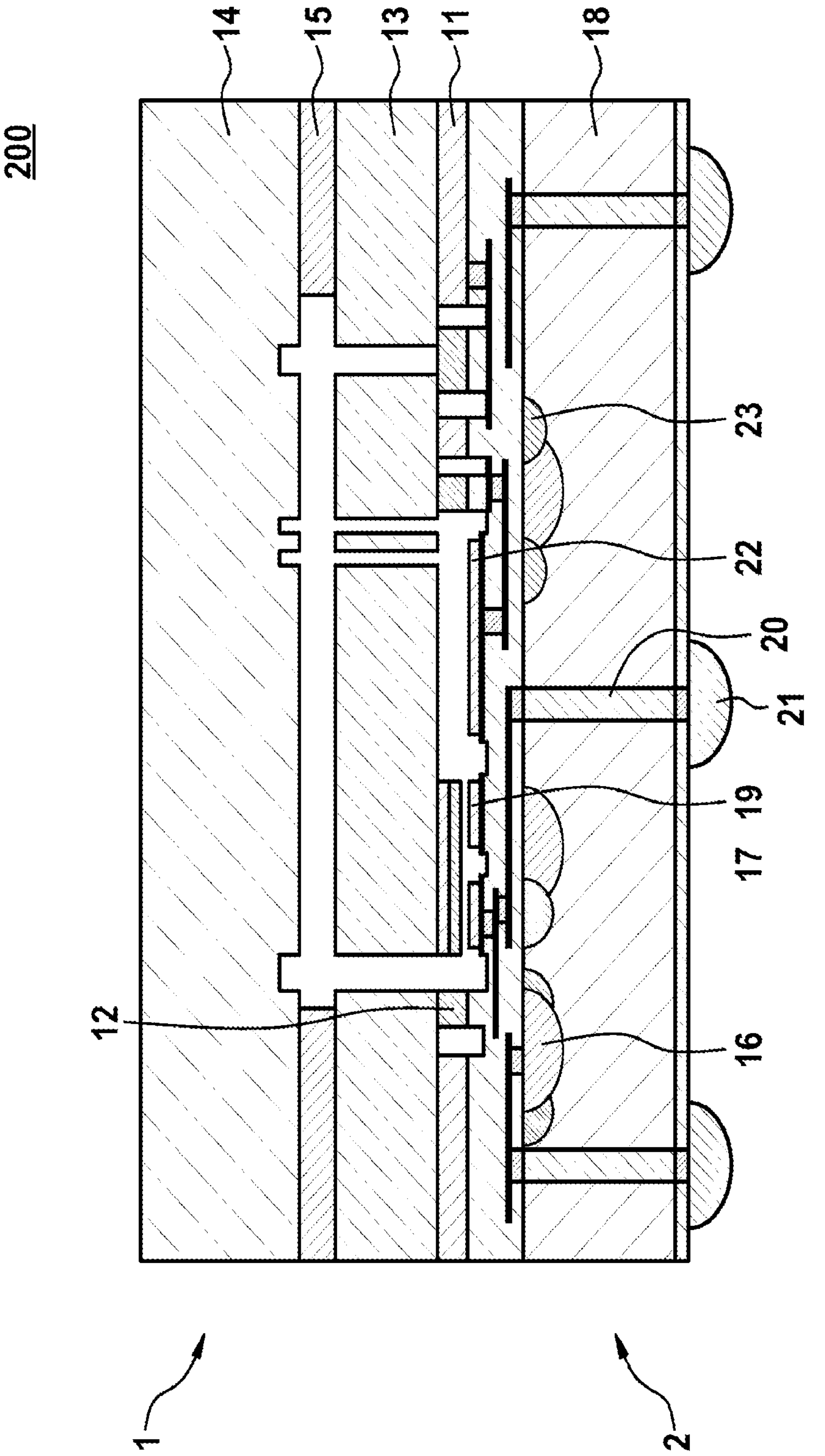
FIG. 2 shows a schematic cross-sectional view of a relay according to a further embodiment of the present invention.

FIG. 2 shows a schematic cross-sectional view of another relay 200. The relay 200 also comprises a MEMS component 1 and an ASIC component 2. The MEMS component 1 comprises a substrate 14 and a first electrode 13 arranged on the substrate 14 via an intermediate layer 15. The MEMS component 1 further comprises a MEMS switch comprising a lower contact structure 19 and an upper contact structure 17.

Via a second electrode 22 that can be controlled by the ASIC component 2, the first electrode 13 can be moved in the direction of the second electrode 22 so that the upper contact structure 17 contacts the lower contact structure 19, thus closing the MEMS switch.

The MEMS component 1 is connected to the ASIC component 2 via an interconnect layer 11. The ASIC component 2 comprises semiconductor structures 16, 23, via which the second electrode 22 can be controlled. Further, through connections 20 and solder balls 21 are provided, the through connections 20 extending through a substrate 18 of the ASIC component 2.

There is also an electrical connection 12 between the ASIC component 2 and the MEMS component 1.

Figure 3:
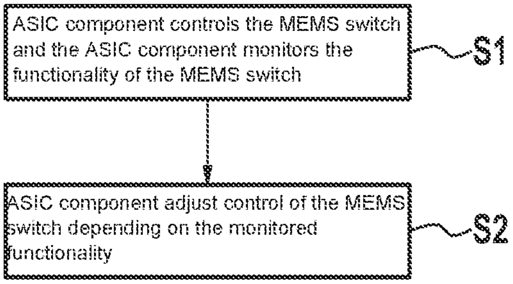
FIG. 3 shows a flowchart of a method for operating a relay according to one embodiment of the present invention.

FIG. 3 shows a flowchart of a method for operating a relay, such as the relay 100, 200 described in FIG. 1 or 2. In particular, the relay 100, 200 comprises a MEMS component 1 with a MEMS switch that can be switched between two stable states. Further, the relay 100, 200 comprises an ASIC component 2, which is configured as a cap of the MEMS component 1.

In a first method step S1, the ASIC component 2 controls the MEMS switch 17, 19 and the ASIC component 2 monitors a functionality of the MEMS switch 17, 19.

In a further method step S2, the ASIC component 2 can adjust the control of the MEMS switch 17, 19 depending on the monitored functionality of the MEMS switch 17, 19. In particular, delay times during opening and closing can be taken into account. Further, depending on the monitored functionality, the ASIC component 2 may output error signals if certain characteristics of the MEMS switch 17, 19 are outside predetermined specifications.

The monitored functionality of the MEMS switch 17, 19 comprises, for example, at least one of a switching state of the MEMS switch 17, 19, a capacitance change at control electrodes of the MEMS switch 17, 19, a closing voltage of the MEMS switch 17, 19, an opening voltage of the MEMS switch 17, 19, a switch-on time of the MEMS switch 17, 19, a switch-off time of the MEMS switch 17, 19, a relay current through the MEMS switch 17, 19, or a contact resistance in a contact area of electrodes of the MEMS switch 17, 19.

The invention claimed is:

1. A relay, comprising:

a housing;

a microelectromechanical (MEMS) component including a MEMS switch that can be switched between two stable states; and an application-specific integrated circuit (ASIC) component, which is arranged together with the MEMS component in the housing, wherein the ASIC component is configured to control the MEMS switch and/or monitor a functionality of the MEMS switch, wherein the ASIC component is configured to monitor a relay current through the MEMS switch.

2. The relay according to claim 1, wherein the ASIC component is configured as a cap of the MEMS component.

3. The relay according to claim 1, wherein the ASIC component is configured to monitor a switching state of the MEMS switch.

4. The relay according to claim 1, wherein the ASIC component is configured to monitor a closing voltage and/or opening voltage of the MEMS switch.

5. The relay according to claim 1, wherein to monitor the relay current through the MEMS switch, the ASIC component is configured to:

monitor a voltage across a shunt resistor of the relay; and ascertain the relay current through the MEMS switch based on the voltage across the shunt resistor.

6. The relay according to claim 1, wherein a coil is arranged around conductive traces of the MEMS switch, and wherein to monitor the relay current through the MEMS switch, the ASIC component is configured to:

monitor an induced voltage of the coil; and ascertain the relay current through the MEMS switch based on the induced voltage.

7. The relay according to claim 1, wherein the ASIC component is configured to monitor a contact resistance of a contact area of electrodes of the MEMS switch.

8. The relay according to claim 1, wherein the ASIC component is configured to monitor a switch-on time and/or switch-off time of the MEMS switch.

9. The relay according to claim 1, wherein the ASIC component is configured to calculate an expected lifetime of the relay based on the monitored functionality of the MEMS switch.

10. The relay according to claim 1, further comprising an electrode for capacitively ascertaining a state of motion of a movable structure of the MEMS switch.

11. The relay according to claim 1, wherein the functionality of the MEMS switch monitored by the ASIC component includes a switching delay of the MEMS switch, and wherein the ASIC component is configured to compensate for the switching delay of the MEMS switch and/or to output a signal based on the monitored switching delay of the MEMS switch.

12. The relay according to claim 1, wherein the ASIC component includes an interface to output an electrical signal in dependence on the monitored functionality of the MEMS switch.

13. The relay according to claim 12, wherein the ASIC component is configured to output an error signal when the monitored functionality of the MEMS switch does not meet predetermined requirements.

14. A method for operating a relay, wherein the relay includes a microelectromechanical (MEMS) component including a MEMS switch that can be switched between two stable states, and wherein the relay includes an application-specific integrated circuit (ASIC) component arranged together with the MEMS component in a housing, the method comprising:

controlling and/or monitoring a functionality of the MEMS switch by the ASIC component, wherein the controlling and/or monitoring includes monitoring, by the ASIC component, a relay current through the MEMS switch.

15. The method according to claim 14, wherein monitoring the relay current through the MEMS switch further comprises:

monitoring a voltage across a shunt resistor of the relay; and ascertaining the relay current through the MEMS switch based on the voltage across the shunt resistor.

16. The method according to claim 14, wherein a coil is arranged around conductive traces of the MEMS switch, and wherein monitoring the relay current through the MEMS switch further comprises:

monitoring an induced voltage of the coil; and ascertaining the relay current through the MEMS switch based on the induced voltage.

* * * * *